United States Patent [19]

Spence

[11] 4,086,989

[45] May 2, 1978

[54] TEMPERATURE CONTROLLED HYDRAULIC COUPLING WITH MOVEABLE DAM

[75] Inventor: Henry Joseph Spence, Indianapolis, Ind.

[73] Assignee: Wallace Murray Corporation, New York, N.Y.

[21] Appl. No.: 741,712

[22] Filed: Nov. 15, 1976

[51] Int. Cl.$^2$ .................. F16D 35/00; F16D 43/25
[52] U.S. Cl. .................................. 192/58 B; 192/82 T
[58] Field of Search .............................. 192/58 B, 82 T

[56] References Cited

U.S. PATENT DOCUMENTS 3,174,600   3/1965   Oldberg ........................... 192/58 B

*Primary Examiner*—Allan D. Herrmann
*Attorney, Agent, or Firm*—Thomas J. Greer, Jr.

[57] ABSTRACT

A hydraulic coupling of the temperature responsive type and particularly adapted to couple the engine to the radiator fan of an internal combustion engine. The specific improvement resides in a dam adjacent the dump hole. The dam is pivotable so as to assume either of two angular positions upon assembly of the coupling. One angular position of the dam accommodates relative rotation of the drive rotor and coupling housing in one direction, the other angular position of the dam accommodating such relative rotation in the other direction. Further, by virtue of its pivoting action the dam can contact the periphery of the drive rotor.

4 Claims, 5 Drawing Figures

TEMPERATURE CONTROLLED HYDRAULIC COUPLING WITH MOVEABLE DAM

This invention relates to a fluid coupling for a temperature controlled fan drive displaying particular utility in the cooling system of an internal combustion engine. Such fan drives are well known and are presently classified in Class 192, Sub-class 58 of the U.S. Patent Office classification system. One example of such a device is shown in U.S. Pat. No. 3,568,647 issued to Adams. Another example is a literature publication entitled COMPARISON OF MODULATED VISCOUS v. ON-OFF FAN CLUTCHES by Everett G. Blair, Society of Automotive Engineers Publication No. 740,596 dated Aug. 12-16, 1974, herein incorporated by reference. In an internal combustion engine of the water cooled type, a cooling liquid is passed through passageways in the engine block. These passageways are part of a hydraulic circuit which includes a pump and a heat exchanger, the heat exchanger commonly termed a radiator. In operation, the pump forces the cooling liquid through the passageways in the engine block to cool it, heat from the engine passing to the coolant liquid, the now heated coolant liquid passing to the radiator where fan-driven air passes therethrough to effect the heat exchange operation and thereby lower the temperature of the coolant liquid. The now cooled liquid enters the passageways of the engine block, thus completing the heat exchange cycle. In the type of fan drive which is temperature controlled, a shear liquid coupling rotatably connects the fan to the engine. As the engine rotates, the fan rotates, supplying the force for driving air through the radiator for the above-mentioned heat exchange or cooling function. In a temperature controlled type of operation, the degree of coupling between the engine and the rotary fan is varied according to the temperature requirements of the engine. Thus, when the automobile or other vehicle is traveling rather rapidly, ambient air is naturally through the radiator and accordingly the air flow required of the fan is appreciably diminished. On the other hand, if the vehicle is moving relatively slowly or is at a complete standstill, particularly at relatively high ambient temperatures, then the air flow required of the fan is higher. By thus matching airflow supplied by the fan with the cooling requirements of the engine, more efficient operation is enjoyed.

In a typical temperature controlled fluid coupling between the engine and the cooling fan of the radiator cooling system a drive disc is coupled to the engine. The drive disc is received by a housing, the drive disc fitting within a drive cavity of the housing. The housing carries the fan blades. A separate cavity in the coupling, termed a reservoir, communicates through a temperature controlled valve with the drive chamber. The coupling housing includes a dam adjacent the periphery of the drive rotor, and a liquid passageway extends from adjacent the dam and radially inwardly therefrom to the reservoir. The reservoir is thus more or less centrally located within the coupling. The dam construction and location is such that upon relative rotation between the drive rotor and housing, the shear liquid continuously impinges against the dam. It then passes through the passageway back to the reservoir. When relatively high cooling requirements are present, it is desired to have a maximum amount of the shear liquid in the drive chamber. Accordingly, the temperature controlled liquid communication (valve) between the reservoir and the drive chamber is open its fullest amount. Thus, while liquid is continually being abstracted or emptied from the drive chamber by virtue of the action of the dam, the liquid is continuously being resupplied from the reservoir to the drive chamber through the now fully opened (valve) communication. When, however, cooling requirements of the engine are at a minimum, the shear liquid is continuously abstracted from the drive chamber by the dam into the reservoir, with the fluid communication (valve) between the reservoir and the drive chamber now closed or partially closed. Thus, a lesser amount of shear liquid is available and fan speed is reduced with a corresponding reduction of parasitic power from the engine.

In typical prior-art constructions of hydraulic fan couplings of this type, the dam is cast or otherwise formed in a portion of the housing (cover) for the coupling. Similarly, the radially extending passageway between the dam and the reservoir chamber is either cast or drilled in the coupling. Thus, the relationship between the dam and the radially extending passageway is fixed at the time of manufacture of the coupling. The upper portion of the radially extending liquid passageway, termed the dump hole, is thus fixed relative to the liquid abutment face of the dam. Accordingly, relative rotation between the rotor and the housing is possible for one direction of rotation only. If the other direction of relative rotation is desired, it is necessary to case or otherwise form the dump hole adjacent a second liquid abutment face of the dam. Thus, in typical prior-art constructions, a temperature controlled hydraulic coupling of this type is capable of only one relative direction of relative rotation between the drive rotor and the driven housing.

According to the practice of this invention, a dam is provided for a temperature controlled hydraulic coupling which enables the coupling to be used for either direction (mode) of relative rotation between the rotor and the housing. This is done by so constructing the dam such that it is capable of assuming either of two fixed angular positions with respect to the housing at the time of assembly of the components of the housing. The dam is in the general form of a rectangular parallelepiped and carries integrally therewith a pintle. The pintle is received by a recess or hole in the cover portion of the coupling. Another portion of the dam is received by another part of the coupling, the dam thus being contacted or supported by the housing at two spaced areas. In one angular position of the dam relative to the housing, the shear liquid strikes one liquid abutment face and forces the shear liquid into the dump hole. In the other fixed angular position of the dam, the second of its two liquid abutment faces is contacted or abutted by the shear liquid, forcing the liquid into the dump hole. Thus, the action is such that the dam assumes one of two angular extremes, locating first one and then the other of its two liquid abutment faces adjacent the dump hole. This positioning is made at the place of assembly of the coupling and once assembled it is to be understood that the angular position of the dam is maintained throughout the life of the coupling, unless the latter is subsequently disassembled to accommodate a different direction of rotation. Thus, instead of fabricating hydraulic couplings for left and for right relative rotations or modes between the drive rotor and the driven housing, the practice of this invention admits of the fabrication of only a single set of elements which when assembled define the coupling, but which may be assembled in only a slightly different manner to accommodate whichever relative rotation is desired.

Referring now to the drawings.

Figure 4:
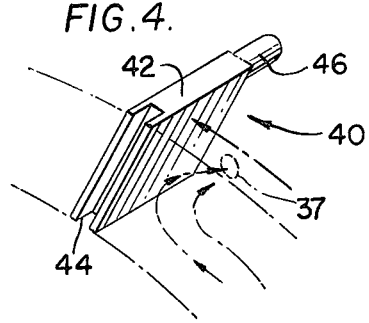
Figure 5:
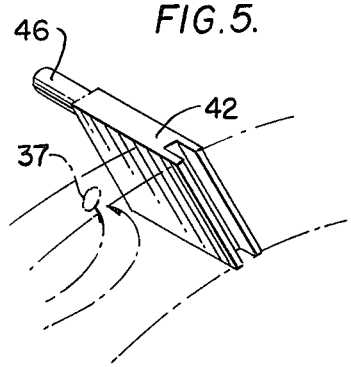

FIGS. 4 and 5 further illustrate, respectively, the two fixed angular positions of the dam with respect to the housing.

Referring now to the drawings, the numeral 10 denotes generally a hydraulic coupling of the temperature controlled type fashioned according to the practice of this invention. The coupling includes a housing cover denoted by the numeral 12 and a main housing portion 14. The elements 12 and 14 are generally annular and are in facing and mating engagement. They are held in this manner as by swaging or by threaded fasteners or the like, the precise manner being not material for an understanding of this invention. The numeral 16 denotes the root portion of one of the fan blades carried by the housing, the blades being attached to the housing as by threaded fasteners or the like. The numeral 18 denotes a drive shaft adapted to be coupled to the output of an engine such as an internal combustion engine, the drive shaft in turn carrying a drive rotor 22. The drive rotor is received by drive cavity or chamber 30, while the numeral 32 denotes a reservoir chamber for the shear liquid. The numeral 34 denotes a partition carrying a temperature responsive valve schematically denoted by the numeral 35. The action of the valve is such that as the cooling requirements of the engine increase, the valve opens while for lower cooling requirements the valve closes or is partially closed. Thus, the amount of opening or closing of valve 35 determines the degree of hydraulic communication between reservoir chamber 32 and drive chamber 30. The numeral 36 denotes a generally radially extending passageway leading from the reservoir chamber 32 to a dump hole 37 and sealed from the exterior by ball 38. The left portion of dump hole 37 communicates with the upper portion of drive chamber 30, being that portion of drive chamber 30 which is radially beyond the periphery of drive rotor 22.

Figure 1:
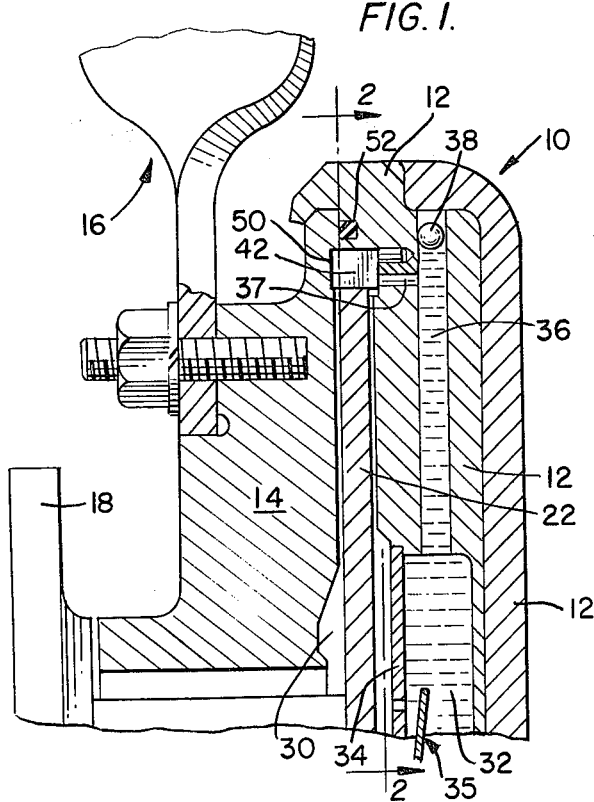
FIG. 1 is a partially schematic, partial transverse cross-section of a temperature controlled hydraulic fan coupling according to this invention.

Referring now to FIGS. 2–5, the numeral 40 denotes generally the dam construction of this invention and is defined by a rectangular parallele-piped of plastic denoted by the numeral 42 and is provided at one edge with a slit 44. An integral pintle 46 is carried by the dam at an opposite edge, the pintle being received in a complementary recess in housing cover 12. At the time of assembly of the hydraulic coupling, the dam is placed in the housing cover 12 and the cover placed over housing 14. The slit 44 defines longitudinal edge portions of the dam, which portions are capable of limited distortion and abut complementary recess 50 in annular housing 14 to thereby provide a seal and support. Thus, the dam is supported on its left and on its right, viewed at FIG. 1.

Figure 2:
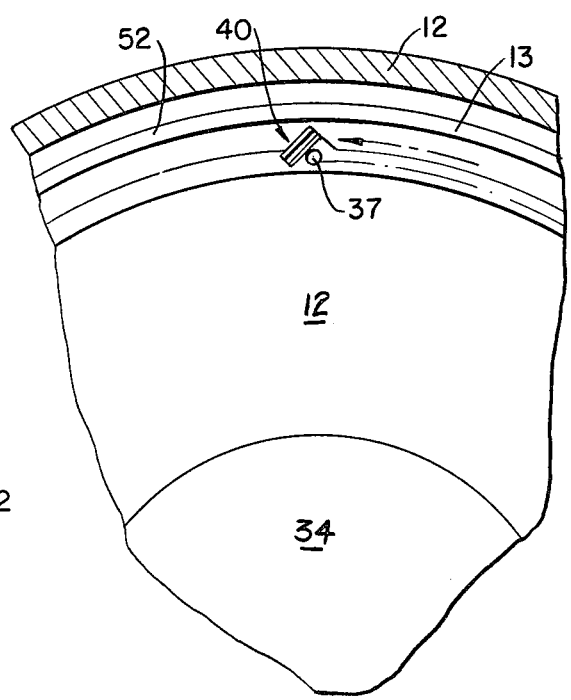
FIG. 2 is a view taken along section 2—2 of FIG. 1.
Figure 3:
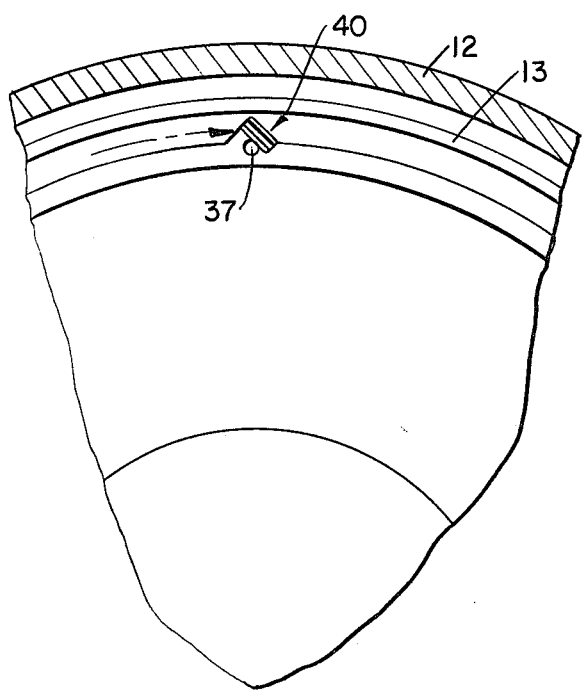
FIG. 3 is a view similar to FIG. 2, but showing the dam in the other of two fixed angular positions relative to a housing portion.

FIGS. 2 and 4 of the drawings indicate one fixed angular position of the dam relative to the housing. FIGS. 3 and 5 illustrate the other fixed angular position of the dam with respect to the housing. Thus, at FIG. 2, the situation is illustrated wherein the rotor 22 (not illustrated) is turning counter-clockwise, in one mode, with respect to the housing. The rotor periphery carries with it a portion of the shear liquid, and this portion abuts the right-hand liquid abutment surface of the dam. Some of this liquid finds its way into dump hole 37 for flow back to reservoir chamber 32. At FIG. 3 of the drawings, the case is illustrated when the drive rotor 22 is turning clockwise, in the other mode, relative to the housing. It will be understood, of course, that these are relative rotations, both the housing and the rotor turning in the same direction, simply turning at different rates. A continuous annular seal 52 may be provided in housing cover 12, the seal abutting the housing portion 14.

The above description has shown rotatable dam 40 in a hydraulic coupling of the temperature controlled type. Further, the hydraulic coupling illustrated carries both a drive chamber and a reservoir chamber. It is to be understood, however, that the utility of the dam is not limited to such hydraulic couplings but may be employed with any similar couplings where the shear liquid is to be circulated or otherwise passed in a generally radial direction by the action at a dam. It will further be understood that the housing 14 and cover 12 both define a housing for the drive rotor 22.

It will be further understood that while a high temperature resistant plastic is generally employed from which to make the pivoted dam 42, other materials may be employed.

What is claimed is:

1. A hydraulic coupling including a drive rotor within a drive chamber in a housing, a shear liquid within the drive chamber, a dam carried by the housing, the dam being adjacent the periphery of the rotor, a passageway in the housing extending radially inwardly from a dump hole adjacent the dam, to a shear liquid reservoir within the housing, the improvement comprising, the dam having two liquid abutment faces and being rotatably attached to the housing so as to assume either of two fixed angular positions with respect to the housing, the dump hole being adjacent one face of the dam in one said fixed angular position and being adjacent the other face of the dam in the said other said fixed angular position, whereby the dam may be positioned in one or the other of its two fixed angular positions at the place of assembly of the hydraulic coupling so as to accommodate either clockwise or counter-clockwise mode of relative rotation between the drive rotor and the housing, the shear liquid carried by the drive rotor periphery striking one face of the dam in one angular position of the dam and at least a portion thereof being deflected and entering the dump hole for return to the shear liquid reservoir in one mode of relative rotation, the shear liquid striking the other face of the dam in the other fixed angular position of the dam and at least a portion thereof being deflected and entering the dump hole for return to the shear liquid reservoir in the other mode of relative rotation.

2. The hydraulic coupling of claim 1 wherein said dam is in the form of a rectangular parallelepiped, the dam carrying a pintle integral therewith, the pintle received in a hole in the housing, one edge of the dam being contiguous to the rotor periphery.

3. The hydraulic coupling of claim 2 wherein the coupling housing is of two facing and mating generally annular portions, the dam being mounted by its pintle in one of the two annular portions, a portion of the dam extending into the other annular portion.

4. The hydraulic coupling of claim 3 wherein the dam is formed of plastic and is provided with a slit running longitudinally of one edge to thereby define a pair of flexible wiping members which abut a portion of one of said annular portions.

* * * * *